Figure 1:
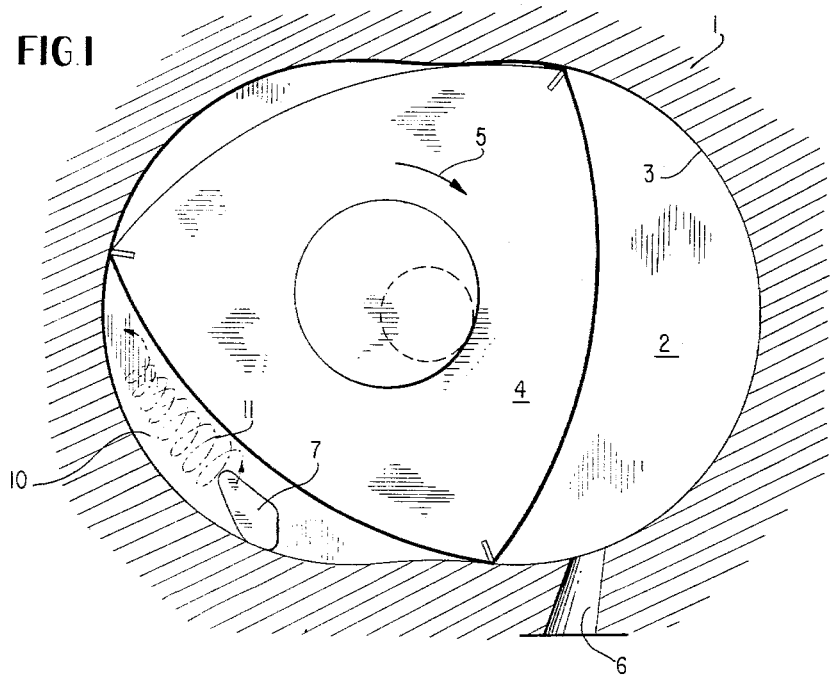

May 31, 1966  P. ORTLIEB  3,253,582

ROTARY PISTON ENGINE

Filed Nov. 8, 1962

INVENTOR.
PAUL ORTLIEB
BY Dicke & Craig
ATTORNEYS

United States Patent Office 3,253,582
Patented May 31, 1966

3,253,582
ROTARY PISTON ENGINE
Paul Ortlieb, Stuttgart-Unterturkheim, Germany, assignor to Daimler-Benz Aktiengesellschaft, Stuttgart-Unterturkheim, Germany
Filed Nov. 8, 1962, Ser. No. 236,224
Claims priority, application Germany, Nov. 18, 1961, D 37,488
10 Claims. (Cl. 123—8)

The present invention relates to a rotary internal combustion engine, especially of trochoidal type of construction, in which the flanks of the piston form, together with the inner surface of the housing, sickle-shaped spaces of varying volume and in which at least the inlet for the combustion air or for the mixture is arranged within the lateral disk-like walls of the housing.

With internal combustion engines of this type, the combustion air or fuel mixture is not deflected or deviated by a reciprocating piston and in particular is not subjected to a vortexing or eddying action but is conveyed or displaced always in the same direction. The result is an insufficient mixture preparation and therewith a mixture preparation reducing the output of the engine.

The present invention aims at producing a vortexing or eddying formation in the combustion air or fuel-air mixture.

As solution to the problem, the present invention essentially consists in providing one inlet channel each in each lateral disk-like wall portion of the housing and to arrange the center longitudinal axes of both inlet channels, on the one hand, at an inclination to a plane disposed transversely or perpendicularly to the axial direction of the engine and, on the other, to extend at a distance either parallel or slightly inclined to each other. As a result of such an arrangement, there is achieved, in combination with the vacuum prevailing within the suction space of the engine, a forceful vortexing or eddying movement of the combustion air or fuel-air mixture within the region directly to the rear of the discharge orifices of the inlet channels which vortexing or eddying movement extends throughout the entire suction space and, depending on the stability thereof, may even still exist in the compression space.

The vortex or eddy formation is essentially assisted by the further feature in accordance with the present invention that the distance of the center longitudinal axes of the inlet channels from each other corresponds essentially to the dimensions of the suction space within the housing in the axial direction of the engine, and further by the fact that the center longitudinal axes of the inlet channels, as viewed in the axial direction of the engine, are disposed either parallel or slightly inclined with respect to the major housing axis.

Accordingly, it is an object of the present invention to provide a rotary piston internal combustion engine of the type described hereinabove which eliminates the aforementioned drawbacks and shortcomings encountered with the prior art constructions.

It is another object of the present invention to provide a rotary piston internal combustion engine in which adequate fuel preparation is assured by simple means to effectively increase the engine output.

Still a further object of the present invention resides in the provision of a rotary piston internal combustion engine provided with simple means producing a forceful and sustaining eddying motion in the combustion air or fuel air mixture within the suction space of the engine which is of such intensity as to be noticeable even in the compression section of the engine.

Another object of the present invention resides in the provision of a rotary piston internal combustion engine so constructed and arranged that an intensive eddying and whirling motion is achieved by extremely simple and relatively inexpensive means that do not require extensive mechanisms or installations, complicated structures or significant changes in the usual designs of the engines.

Figure 2:
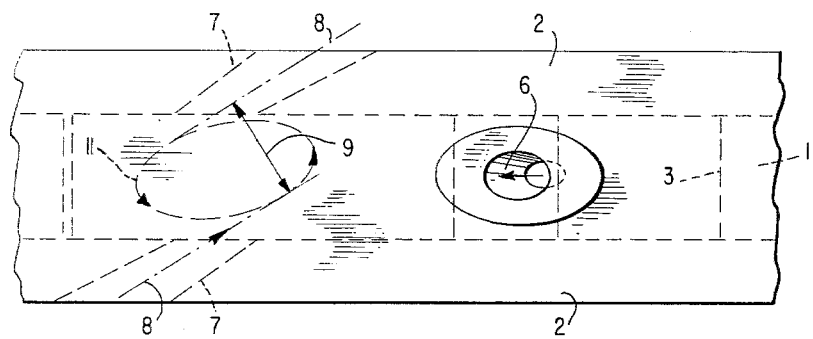

These and other objects, features and advantages of the present invention will become more obvious from the following description when taken in connection with the accompanying drawing which shows, for purposes of illustration only, one embodiment in accordance with the present invention, and wherein FIGURE 1 is a cross sectional view, transverse to the axis of rotation, of a rotary position internal combustion engine in accordance with the present invention, and FIGURE 2 is a partial plan view on the housing of the engine illustrated in FIGURE 1, taken in the direction of the minor housing axis.

Referring now to the drawing wherein like reference numerals are used throughout the two views to designate like parts, reference numeral 1 designates therein the housing of the internal combustion engine within which is provided a hollow space. The hollow space within the housing 1 is closed off in front and in the rear thereof by plane lateral disk-like wall portions 2 and in cross section by the epitrochoidally-shaped cam track surface 3. Within the hollow space is arranged, as internal envelope form of the epitrochoidal shape of the cam track surface 3, the trangular piston 4 which is supported, in a manner known per se, on an eccentric of the drive shaft and which rotates in the direction of arrow 5 at a predetermined ratio to the rotational speed of the drive shaft. The three corners of the piston 4 continuously and simultaneously contact the cam track surface 3. As may also be seen from FIGURE 2, there is arranged within the circumferential wall of the housing, to one side of the major axis of the hollow space, the outlet channel 6, and within the disk-like lateral wall portions 2 the inlet channels 7. The longitudinal center axes 8 of the inlet channels 7 are disposed, on the one hand, at an inclination to a plane disposed transversely to the axial direction of the engine, and, on the other, extend from one another at the distance 9, either parallelly or with a slight inclination to each other. As viewed in the axial direction of the engine, the center longitudinal axes 8 are disposed either parallelly or slightly inclined to the major housing axis. The distance 9 corresponds approximately to the dimensions of the suction space 10 in the axial direction of the engine. A forceful air- or mixture vortexing or eddying motion forms, in combination with the vacuum prevailing within the suction space 10, from the point of the discharges of the inlet channels 7, as is approximately illustrated in FIGURES 1 and 2 and designated therein by reference numeral 11. The vortexing or eddying motion 11 extends over the entire suction space 10 and even remains present also, with a larger intensity thereof, during the subsequent compression.

The arrangement of a spark plug and possibly of an injection nozzle for the operation of the engine as Otto engine and the arrangement of the injection nozzle for the operation of the engine as diesel engine are not shown in the drawing since these parts may be of any conventional arrangement and form no part of the present invention.

While I have shown and described one embodiment in accordance with the present invention, it is understood that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:
1. A rotary piston internal combustion engine, especially of trochoidal construction, comprising housing means provided with an internal surface and with two disk-like lateral wall portions defining a hollow space, rotary piston means within said hollow space, the flanks of said piston means forming together with the internal surface of said housing means substantially sickle-shaped spaces of varying volume, one of said spaces being effectively a suction space, and inlet channel means provided within each disk-like wall portion of said housing means, the center longitudinal axes of said inlet channel means being disposed, on the one hand, at an inclination to a plane disposed transversely to the axial direction of the engine and, on the other, extending approximately parallelly at a distance with respect to each other, the distance of the center longitudinal axes of the inlet channel means corresponding substantially to the dimension of the suction space within said housing means in the axial direction of the engine.

2. A rotary piston internal combustion engine, especially of trochoidal construction, comprising housing means provided with an internal surface and with two disk-like lateral wall portions defining a hollow space, rotary piston means within said hollow space, the flanks of said piston means forming together with the internal surface of said housing means substantially sickle-shaped spaces of varying volume, one of said spaces being effectively a suction space, and inlet channel means provided within each disk-like wall portion of said housing means, the center longitudinal axes of said inlet channel means being disposed, on the one hand, at an inclination to a plane disposed transversely to the axial direction of the engine and, on the other, extending approximately parallelly at a distance with respect to each other, the distance of the center longitudinal axes of the inlet channel means corresponding substantially to the dimension of the suction space within said housing means in the axial direction of the engine, and the center longitudinal axes of the inlet channel means as viewed in the axial direction of the engine, being disposed at least approximately parallelly to the major housing axis.

3. In a rotary piston internal combustion engine, particularly of trochoidal construction which includes a casing portion provided with an internal surface and two disk-like side walls, and in which the flanks of the piston form together with the internal surface of the housing substantially sickle-shaped spaces of varying volume and in which at least the inlet channel for the combustion air or fuel air mixture is arranged within the disk-like side walls of the housing,
the improvement essentially consisting of an inlet channel in each of said disk-like side walls of the housing with means for producing an intensive, approximately circularly shaped eddying motion within the space of varying volume into which terminate the inlet channels with the axis of the eddying motion being generally in the direction of rotation of the piston.

4. A rotary piston internal combustion engine, especially of trochoidal construction, comprising housing means provided with an internal surface and with two disk-like lateral wall portions defining a hollow space, rotary piston means within said hollow space, the flanks of said piston means forming together with the internal surface of said housing means substantially sickle-shaped spaces of varying volume, and inlet channel means provided within each disk-like wall portion of said housing means, the center longitudinal axes of said inlet channel means being disposed, on the one hand, at an inclination to a plane disposed transversely to the axial direction of the engine and, on the other, extending approximately parallelly at a distance with respect to each other, and the center longitudinal axes of the inlet channel means as viewed in the axial direction of the engine, being disposed at least approximately parallelly to the major housing axis.

5. In a rotary piston internal combustion engine, particularly of trochoidal construction which includes a casing portion provided with an internal surface and two disk-like side walls, and in which the flanks of the piston form together with the internal surface of the housing substantially sickle-shaped spaces of varying volume and in which at least the inlet channel for the combustion air or fuel air mixture is arranged within the disk-like side walls of the housing,
the improvement essentially consisting of an inlet channel in each of said disk-like side walls of the housing with means for producing an intensive eddying motion within the space of varying volume into which terminate the inlet channels,
the center longitudinal axes of both inlet channels being disposed, on the one hand obliquely to a plane disposed substantially perpendicularly to the axial direction of the engine and, on the other, extending at a distance at least approximately parallelly to each other,
the distance of the center longitudinal axes of the inlet channels from each other corresponding substantially to the dimensions of the suction space within the housing in the axial direction of the engine,
and the center longitudinal axes of the inlet channels, as viewed in the axial direction of the engine, being disposed at least approximately parallelly to the major housing axis.

6. A rotary piston internal combustion engine, especially of trochoidal construction, comprising housing means provided with an internal surface and with two disk-like lateral wall portions defining a hollow space, rotary piston means within said hollow space, the flanks of said piston means forming together with the internal surface of said housing means substantially sickle-shaped spaces of varying volume, and inlet channel means provided within each disk-like lateral wall portion of said housing means, the center longitudinal axes of said inlet channel means being disposed, on the one hand, at an inclination to a plane disposed transversely to the axial direction of the engine, and, on the other, extending parallelly at a distance with respect to each other.

7. A rotary piston internal combustion engine, especially of trochoidal construction, comprising housing means provided with an internal surface and with two disk-like lateral wall portions defining a hollow space, rotary piston means within said hollow space, the flanks of said piston means forming together with the internal surface of said housing means substantially sickle-shaped spaces of varying volume, and inlet channel means provided within each disk-like lateral wall portion of said housing means, the center longitudinal axes of said inlet channel means being disposed, on the one hand, at an inclination to a plane disposed transversely to the axial direction of the engine and, on the other, extending with a slight inclination at a distance with respect to each other.

8. In a rotary piston internal combustion engine, particularly of trochoidal construction which includes a casing portion provided with an internal surface and two disk-like side walls, and in which the flanks of the piston form together with the internal surface of the housing sickle-shaped spaces of varying volume and in which at least the inlet channel for the combustion air or fuel air mixture is arranged within the disk-like side walls of the housing,
the improvement essentially consisting of an inlet channel in each of said disk-like side walls of the housing with means for producing an intensive, approximately circularly shaped vortexing with the space of varying volume into which the inlet channels discharge with the axis of the approximately circular shaped vortexing extending generally in the direction of rotation of the piston, and the center longitudinal axes of the inlet channels, as viewed in the axial direction of the engine, being disposed parallelly to the major housing axis.

9. In a rotary piston internal combustion engine, particularly of trochoidal construction which includes a casing portion provided with an internal surface and two disk-like side walls, and in which the flanks of the piston form together with the internal surface of the housing sickle-shaped spaces of varying volume and in which at least the inlet channel for the combustion air or fuel air mixture is arranged within the disk-like side walls of the housing, the improvement essentially consisting of an inlet channel in each of said disk-like side walls of the housing to produce an intensive vortexing with the space of varying volume into which the inlet channels discharge, and the center longitudinal axes of the inlet channels, as viewed in the axial direction of the engine, being disposed at a small angle to the major housing axis.

10. In a rotary piston internal combustion engine, particularly of trochoidal construction which includes a casing portion provided with an internal surface and two disk-like side walls, and in which the flanks of the piston form together with the internal surface of the housing substantially sickle-shaped spaces of varying volume and in which at least the inlet channel for the combustion air or fuel air mixture is arranged within the disk-like side walls of the housing, the improvement essentially consisting of an inlet channel in each of said disk-like side walls of the housing with means for producing an intensive eddying motion within the space of varying volume into which terminate the inlet channels, the distance of the center longitudinal axes of the inlet channels from each other corresponding substantially to the dimensions of the suction space within the housing in the axial direction of the engine, and the center longitudinal axes of the inlet channels, as viewed in the axial direction of the engine, being disposed at least approximately parallelly to the major housing axis.

References Cited by the Examiner

UNITED STATES PATENTS

| 1,482,627 | 2/1924 | Bullington | 123—11 |
| 1,568,052 | 1/1926 | Bullington | 123—11 |
| 1,829,391 | 10/1931 | Bullington | 123—11 |
| 2,988,065 | 6/1961 | Wankel et al. | 123—8 |

SAMUEL LEVINE, *Primary Examiner.*

JOSEPH H. BRANSON, JR., *Examiner.*

F. T. SADLER, *Assistant Examiner.*